Figure 5:
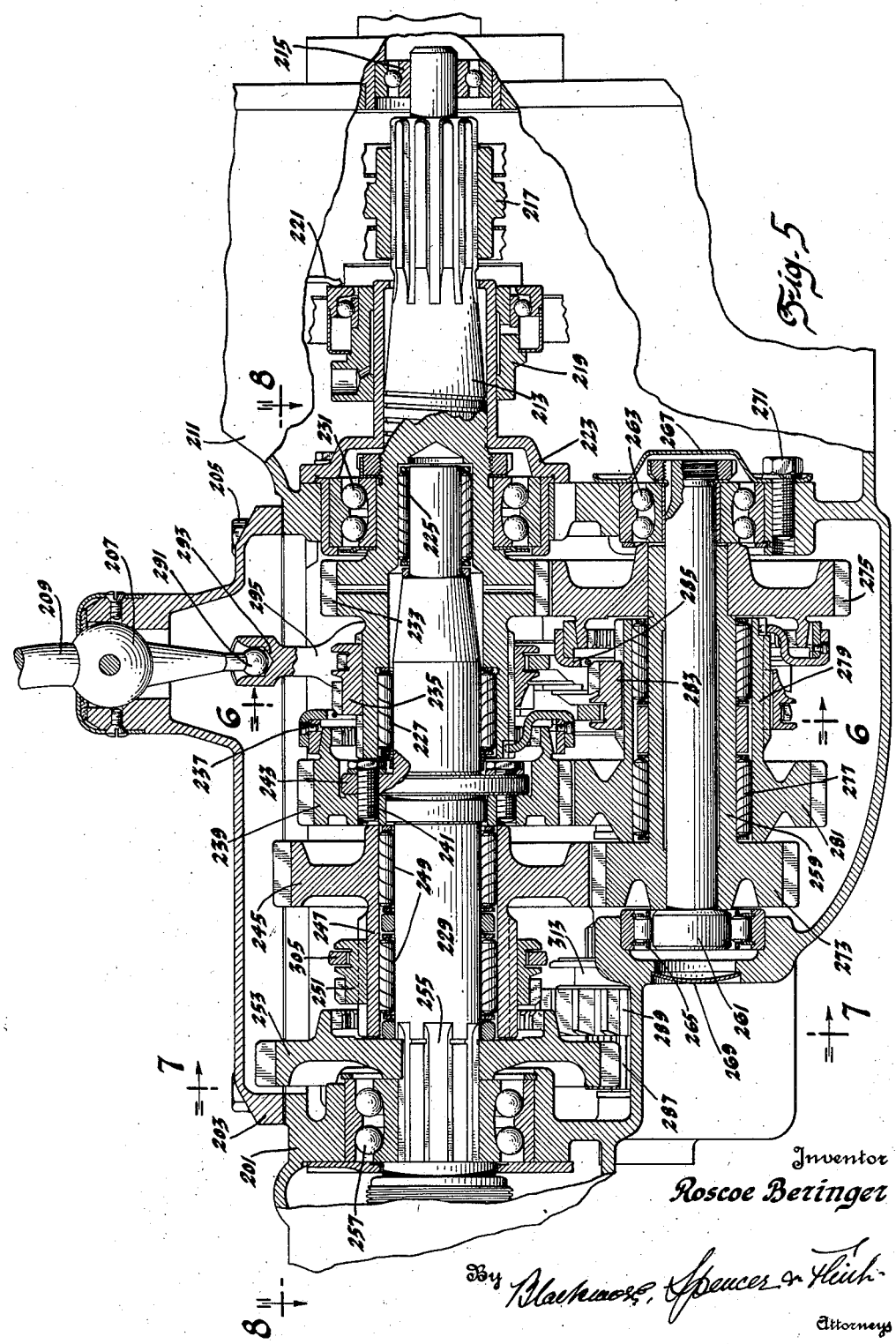

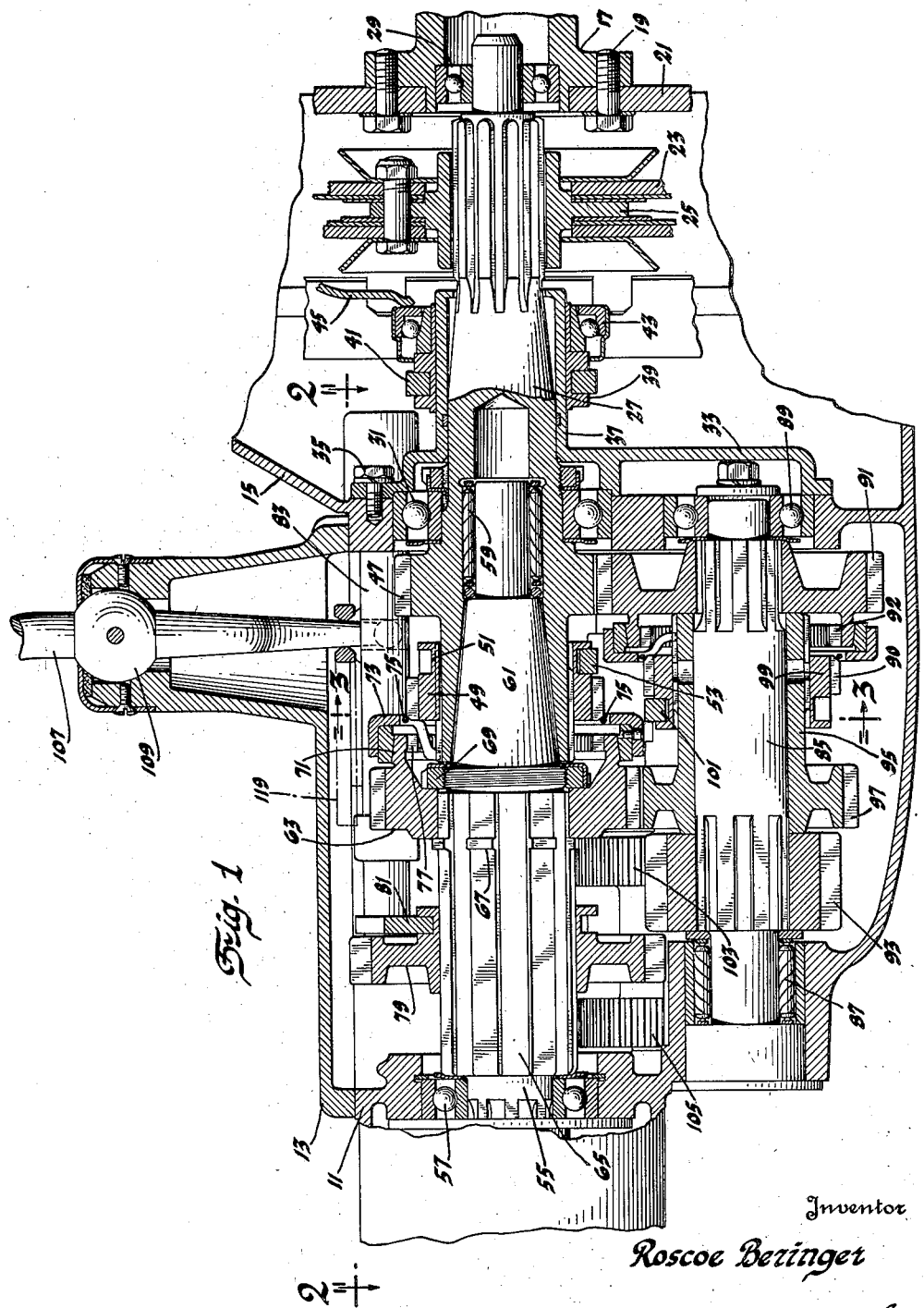

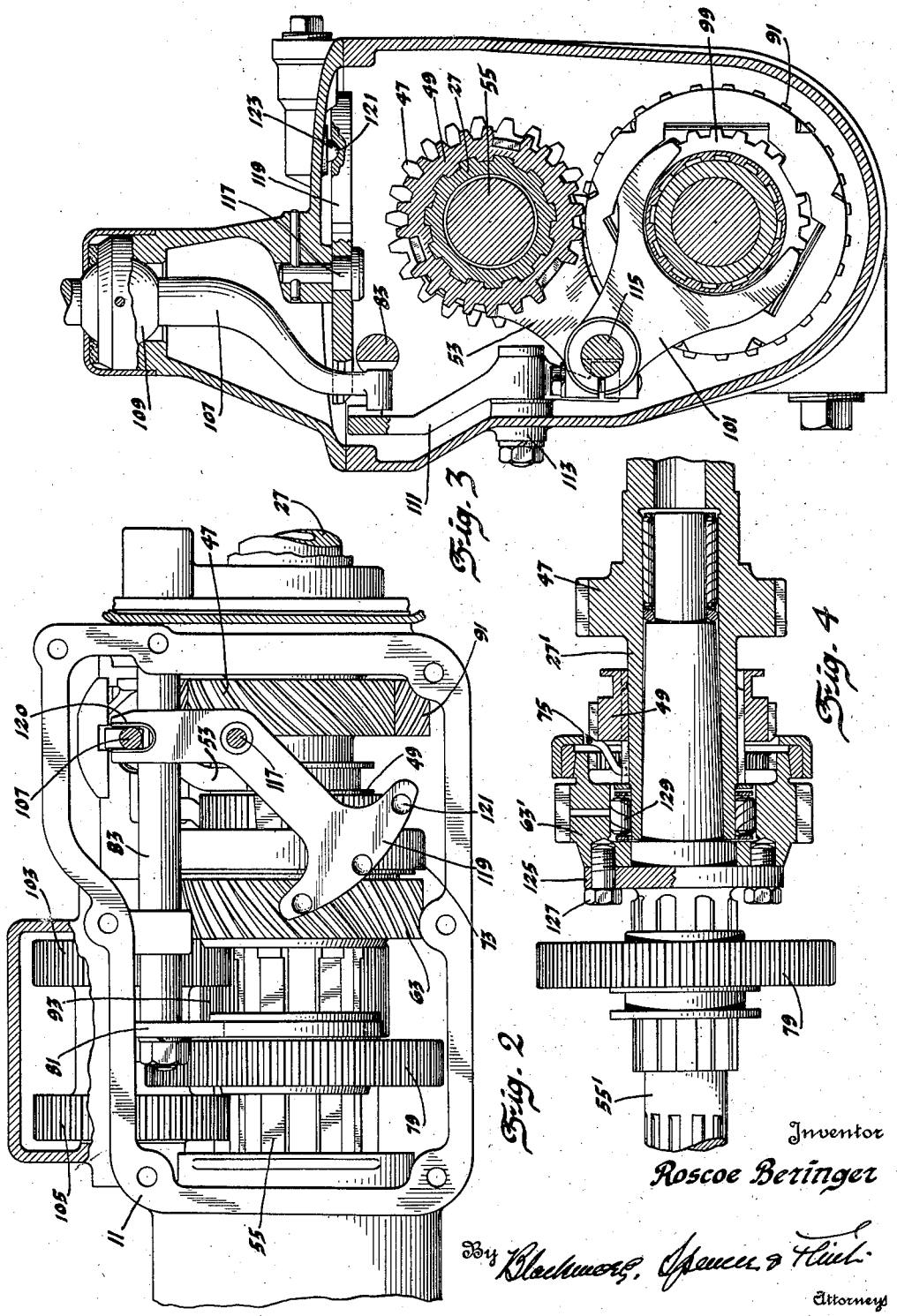

Aug. 21, 1934.    R. BERINGER    1,970,729
HELICAL GEAR TRANSMISSION
Filed Sept. 18, 1931    5 Sheets-Sheet 3

Inventor
Roscoe Beringer

By Blackmore, Spencer & Heath
Attorneys

Aug. 21, 1934.    R. BERINGER    1,970,729
HELICAL GEAR TRANSMISSION
Filed Sept. 18, 1931    5 Sheets-Sheet 4
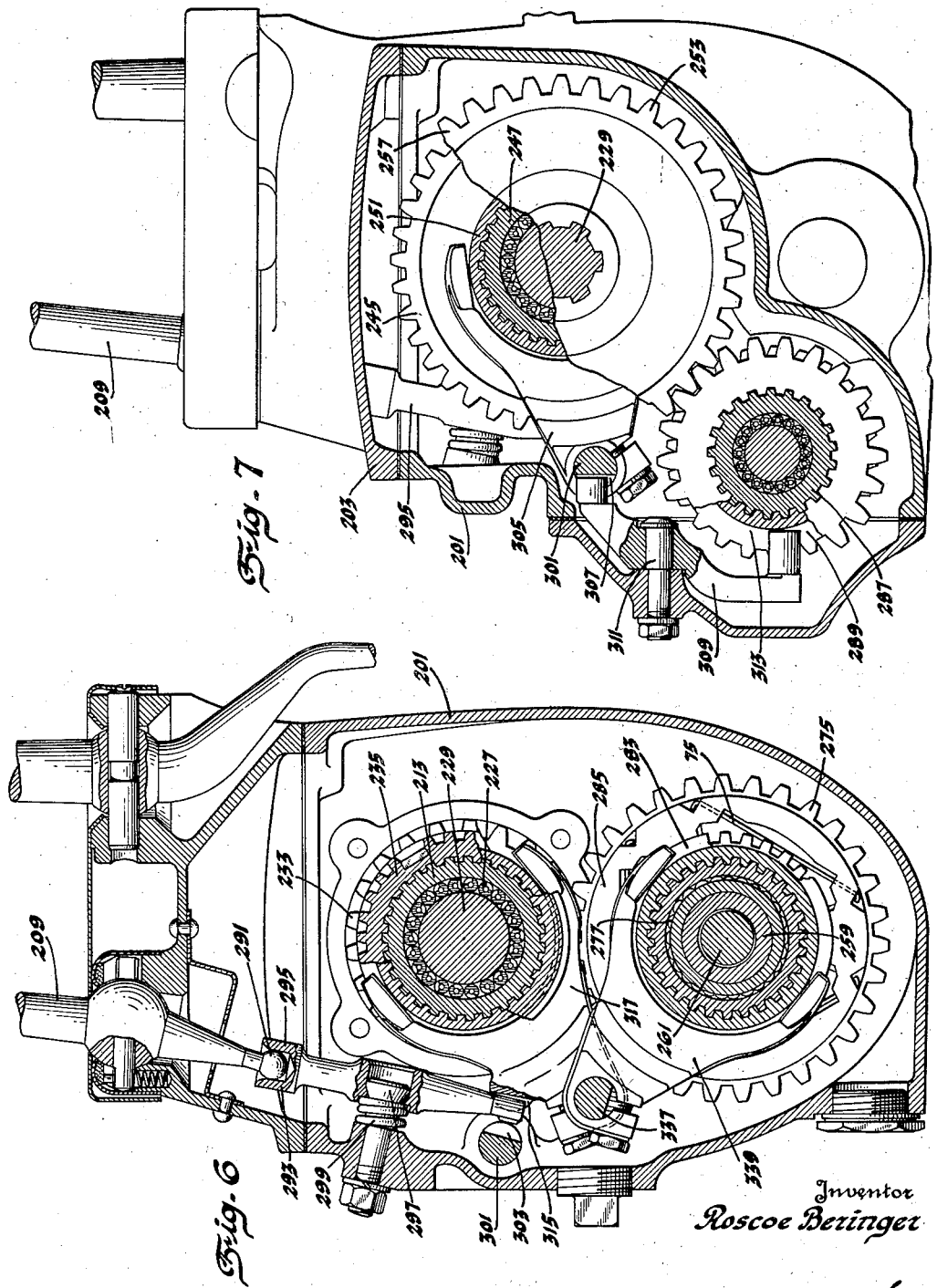
Inventor
Roscoe Beringer
By Blackmore, Spencer & Hulse
Attorneys

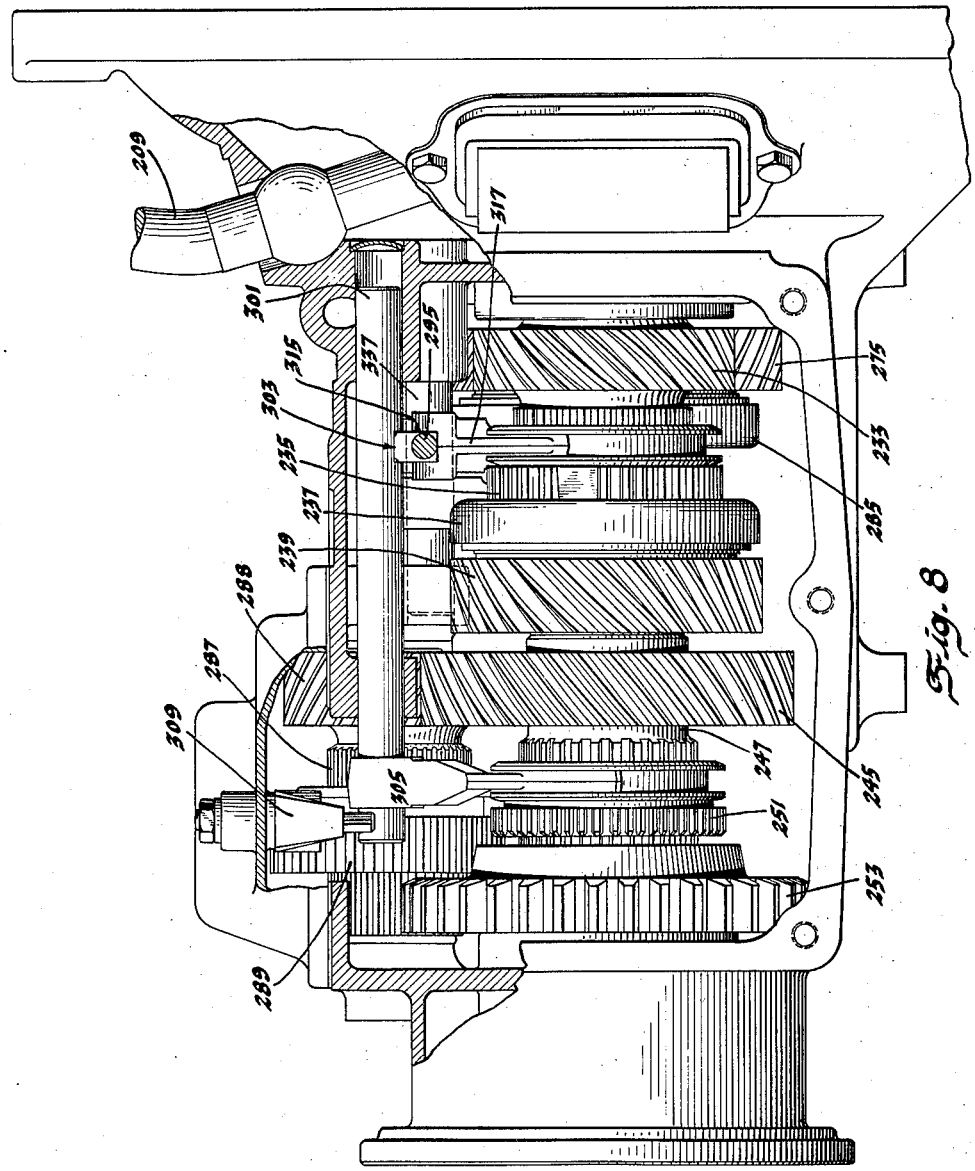

Patented Aug. 21, 1934

1,970,729

UNITED STATES PATENT OFFICE 1,970,729

HELICAL GEAR TRANSMISSION

Roscoe Beringer, Detroit, Mich., assignor to General Motors Corporation, Detroit, Mich., a corporation of Delaware Application September 18, 1931, Serial No. 563,500

7 Claims. (Cl. 74—359)

The invention relates to change speed mechanism and is intended primarily for use on motor vehicles.

An object of the invention is to provide a compact, comparatively noiseless transmission mechanism and one in which the several gear ratios may be readily rendered active without clash.

Other objects and advantages will be understood from the following description.

In the drawings accompanying this description, Figure 1 is a vertical section through one embodiment of the invention. Figure 2 is a plan view of the mechanism as seen from line 2—2 of Figure 1. Figure 3 is a sectional view on line 3—3 of Figure 1. Figure 4 is a sectional view of the aligned shafts showing a slightly modified form. Figure 5 is a vertical sectional view illustrating a second embodiment of the invention. Figure 6 is a section on line 6—6 of Figure 5. Figure 7 is a sectional view on line 7—7 of Figure 5. Figure 8 is a plan view of the mechanism within the transmission housing as seen from line 8—8 of Figure 5.

Referring first to Figures 1, 2 and 3, numeral 11 represents the transmission housing having a cover 13. At its front end the housing is formed with a portion 15 constituting a closure for the vehicle clutch. The engine shaft 17 carries, by means of fastening means 19, the fly wheel 21 (only partially shown). The fly wheel, by means of driving plates, not shown, rotates driven plates 23 carried by a hub 25 splined to the clutch connection shaft 27. This shaft 27 is rotatably supported in bearings 29 at the fly wheel end, and it is also supported in bearings 31 in the front wall of housing 11. A closure cap 33 is secured to the housing 11 by fastening means 35. This cap engages and retains the outer race of bearing 31. The closure cap is also formed with the tubular sleeve 37. Slidable on sleeve 37 is a collar 39 arranged to be moved by the forks 41 of a suitable actuating lever. The sliding movement operates through the instrumentality of anti-friction means 43, to release the clutch, operating by means of fingers 45. The clutch is normally held in engagement by suitable springs (not shown) in the usual way. The shaft 27 immediately within the bearings 31 is formed with a helical gear 47. Inwardly beyond the gear 47 the shaft is splined to slidingly carry a clutch member 49. Clutch member 49 is formed with a collar 51 for engagement with the arms of a shift fork 53.

A main shaft 55 is supported by ball bearings 57 in the rear wall of casing 11 and long roller bearings 59 within the tubular part of the open end of shaft 27. Shaft 55 has a tapered region 61 within a correspondingly shaped part of the open end of shaft 27. A helical gear 63 is positioned fixedly on shaft 55 by the use of splines 65 on the shaft, radial lugs 67 and a threaded ring 69. This gear 63 has an over-hanging frictional face 71 for engaging a corresponding frictional surface of a frictional ring 73, held from rotation by the splines of shaft 27. Tangential rods 75 on the ring 73 are engaged by the clutch 49 to effect the frictional engagement and the synchronization of the shafts 27 and 55 prior to the positive engagement of the teeth of clutch 49 with the teeth 77 of the gear 63. Slidable along the splines of shaft 55 is the gear 79 having a collar to receive the arms of a shifting fork 81 carried by rod 83.

At 85 is shown a countershaft positioned in parallelism with the aligned shafts, and rotatably supported in rear roller bearings 87 and in front ball bearings 89. Keyed to the front end of shaft 85 is the driven helical gear 91 which is in constant mesh with gear 47 of the driving shaft. The rear end of shaft 85 carries nonrotatably a gear 93 for engagement at times with gear 79 for low speed driving. Rotatably supported on the countershaft and positioned between gears 93 and 91 is a sleeve 95 having at its rear end an integral helical gear 97, this gear being in constant mesh with gear 63 on the driven shaft. Slidably splined on sleeve 95 is a clutch member 99 actuated by a fork 101. On clutch member 99 and the gear 91 are jaw teeth 90 and 92 respectively, whereby the sleeve may be locked from rotation relative to the countershaft, there being a synchronizing friction clutch between these parts and actuated by the axial movement of the clutch member to prevent the positive locking of the gear 97 to the countershaft until the parts are synchronized. The provision for synchronizing is the same as that shown and described above in connection with clutch member 49 and gear 63 and need not be further described.

A double, reverse idler is used. This member includes a gear 103 in constant mesh with the front portion of gear 93 and a spaced rear gear element 105 to be engaged by gear 79 when that gear is moved from the position shown in Figure 1 toward the rear of the transmission.

A shift lever 107 is provided with a ball joint at 109 in the dome of the cover 13. The lower end of the lever may be moved transversely to engage the rod 83 slidably mounted in the transmission casing. When the lever is so engaged with the rod, a forward movement of the knob and of the lever 107 shifts the rod 83 and the gear 79 by means of the fork 81 toward the rear end into engagement with gear 105 of the reverse idler. The vehicle is then driven in reverse through the helical gear train comprising gears 47 and 91, the spur gear train including gears 93 and 103 and through the spur gear train including gears 105 and 79. Also while the lever 107 is still in engagement with rod 83 the latter may be moved forwardly by a rearward movement of the knob and of the lever from its neutral position to effect the engagement of gear 79 with gear 93. When the parts are so positioned, the vehicle will be driven in a forward direction at low speed through a helical gear train comprising gears 47 and 91 and through the spur gear train including gears 93 and 79.

For second and high speed driving, the lever 107 is moved transversely in the opposite direction. Its upper end is moved to the right by the operator. The lower end then enters a notch in a lever 111. The forward and rearward movement of lever 107 then rocks lever 111 about its fulcrum 113, and a rod 115 engaged by lever 111 is reciprocated. Forks 53 and 101 are secured to rod 115 and reciprocate simultaneously, and in the same direction with rod 115. These forks 53 and 101 are the forks which reciprocate the clutch members 49 and 99. A forward movement of rod 115 and the two forks is effected by a forward movement of the upper end of lever 107. Such a movement engages the friction clutch between clutch sleeve 99 and gear 91 on the countershaft, and after synchronization effects a jaw clutch engagement between these parts. As a result, sleeve 95 is locked to the countershaft and the vehicle is driven in second speed through two helical gear trains as follows:

Gears 47 and 91 and 97 and 63. Second speed is therefore a quiet speed operable through helical gears, and owing to the provision for synchronization is quickly and quietly engaged. A movement of the knob of lever 107 to the rear while still engaging lever 111 releases the second speed clutch and causes clutch member 49 to frictionally and then rigidly lock the gear 63 from rotation relative to the driving shaft. The two shafts 27 and 55 are then rotated in unison and the vehicle is driven at high speed.

The location of one synchronizing clutch on the countershaft aids in reducing the dimension of the transmission unit as a whole. This is also advantageous in that it reduces the distance between bearings and thereby avoids shaft deflection and reduces noise. It is possible also to make use of wider gear faces and gears of lesser radial dimensions, thereby reducing the moment of the idling gears.

At 117 is shown the pivot for a horizontal swinging lever 119. This lever has a notch 120 at one end through which the end of the lever 107 passes. At its other ends the lever has recesses or pockets 121, each of which is adapted to receive a detent 123 carried by the casing cover. This detent device is to locate the shift mechanism in its three positions of adjustment, in high speed, in neutral and in second speed. Similar detents will also be provided for the several positions of the low speed shift rod 83.

In Figure 4 is shown a modification in the mounting of the second speed driven gear on the splined shaft. The splined shaft 55' has a radial flange 125 to which is secured by fastening means 127 the second speed driven gear 63'. Roller bearings 129 are located in the plane of the teeth of gear 63' between the gear and the external plane surface of the end of the driving shaft 27'. This bearing 129 serves to steady the gear 63' when operating. Such steadying influence may be desirable owing to the over-hanging condition of the gear 63' relative to its support on the main shaft. In other respects, this form of the invention is like that of Figure 1.

Figures 5 to 8 illustrate a form of the invention in which the quiet drive obtained by the use of helical gears is used not only for second speed driving but also for driving in low speed. In this form of the invention, the casing 201 has a cover 203 secured by fastening means 205. The cover 203 is formed with a dome in which is the ball joint 207 for the manually operable lever 209. The housing or casing 201 is formed with a clutch housing 211. The clutch connection shaft 213 has a ball bearing 215 at its front end in the end of the engine shaft. Non-rotatably mounted on the clutch connection shaft is the hub 217 of the driven clutch member. The clutch may be engaged in the usual way, not shown, and may be released by the sliding member 219 operating upon the fingers 221. The member 219 is actuated by the usual clutch lever and slides on an extension of the cover plate 223 which is secured to the front of the transmission housing. The end of the shaft 213 within the transmission housing is apertured and formed with two spaced cylindrical surfaces for roller bearings 225 and 227 surrounding similarly shaped parts of the main shaft 229. Immediately within the bearings 231 by which the clutch connection shaft is rotatably supported in the front wall of the transmission housing, is a helical gear 233 formed as an integral part of said shaft 213. Just beyond this gear the shaft is splined for the slidable support of a clutch 235. Also carried by the end of the splined portion of shaft 213 is a drum of a frictional synchronizing clutch member 237. This frictional clutch member engages a cooperating clutch face on a helical gear 239 which is secured by fastening means 241 to a flange 243 on the main shaft 229. A low speed driven helical gear 245 is provided with a comparatively long hub 247 which is rotatably supported on shaft 229 by roller bearings 249. This elongated helical gear is splined for the sliding support of a clutch member 251 having teeth intended to engage cooperating teeth on a gear 253, the latter held from rotation on shaft 229 by splines 255. The gear 253 engages the inner race of bearings 257 by which the main shaft 229 is rotatably supported in the casing wall.

A parallel countershaft 259 is carried by a shaft 261 rotatably supported by bearings 263 and 265 in the front and rear casing walls. A cover member 267 and a plug 269 inclose the ends of the countershaft 261, the cover being held by fastening means 271. The countershaft is formed integrally with a helical low speed driving gear 273, this gear being in constant mesh with gear 245. The countershaft also has suitably secured to it a helical driven gear 275 in constant mesh with gear 233 on the driving shaft. On the countershaft between gears 273 and 275 is rotatably supported by roller bearings 277 a splined hub 279 having at one end thereof an integrally formed helical gear 281. This gear is the second speed driving gear and is in constant mesh with gear 239. On the splined hub 279 there slides a clutch member 283 having external teeth to engage internal teeth formed on gear 275. Also mounted on the splined hub 279 is the drum of a friction clutch 285 which may be brought into engagement with the cooperating friction face on gear 275. The engagement of the frictional faces is effected by the initial movement of the clutch 285 which, after synchronization is effected, moves beyond and through spaces provided therefor in the friction drum to cause the clutch teeth to engage. This is a well-known form of friction and jaw tooth clutch, and needs no further description, especially since it is not a part of this invention. A reverse idler shaft having a long splined hub 287 carries slidably but non-rotatably, a gear 289 which is to be engaged with gear 253. Shaft 287 receives its rotation in much the conventional way by means of a gear 288 rigid with the shaft and which gear is in engagement with the low speed driving gear 273.

Shift lever 209 at its lower end has a ball 291 which is received within a recess 293 of a second lever 295 which is pivoted at 297 for movement both transversely and longitudinally, a spring 299 being used to prevent rattling of the lever about its fulcrum. Owing to the use of the lever 295, movements at the lower end thereof correspond in direction with the movements at the knob end of lever 209.

Slidable in the casing 201 is a shift rod 301. It is formed with a notch 303 to be engaged at times by the end of lever 295 when the latter is rocked transversely by a similar movement of the hand lever 209. Rod 301 carries a fork 305 which engages the collar associated with clutch 251. The rod 301 also is provided with a notch 307 engaged by the upper end of a lever 309 fulcrumed at 311 on the wall of the casing. The lower end of the lever 309 has a projecting arm engaging the collar 313 of the reverse idler. Axial reciprocation of rod 301 will therefore simultaneously move the clutch 251 and the reverse idler but in opposite directions. When out of engagement with rod 301, the lower end of the lever 295 may engage in a notch 315 in the fork 317 which engages the collar of clutch 235. A shaft 337 is carried by a fork 317, and secured to said shaft is a fork 339, engaging clutch member 283. In consequence of this construction, forks 317 and 339 move simultaneously in the same longitudinal direction. It will be seen that the knob of lever 209 moves in the same direction as the lower end of lever 295. When the knob is moved to the left, the lower end of lever 295 moves to the left and engages rod 301. A movement to the rear moves fork 305 to the rear, thereby similarly moving clutch 251 and locking gear 245 to the driven shaft 229. Low speed driving is thereby effected through the gear train, including gears 233 and 275 and gear train including gears 273 and 245. Since both trains make use of helical gears, a quiet low speed drive results. At the same time, the lever 309 has been rocked to move gear 289 from its neutral position forwardly and away from gear 253. Instead of moving the knob of lever 209 to the rear, it may be pushed in a forward direction. The reverse idler would then be engaged with gear 253 and the clutch 251 moved forwardly from its neutral position and away from the position it assumes when in low speed driving position.

If the knob of lever 209 be moved to the right, so that the lower end of lever 295 engages fork 317, forward and rearward movements may then be made to move the clutches 235 and 283 simultaneously in the same direction as the lever knob. If moved forwardly, clutch 235 is moved in a releasing direction, and clutch 283 is moved to make a clutch engagement, effecting a drive through gears 233 and 275 and gears 281 and 239. This jaw clutch engagement takes place only after the parts are synchronized. In this case, there is thus provided a silent second speed driving engagement, and by the use of a synchronizer, a silent and quick shifting is provided. If a rearward movement from neutral is given the lever knob, while the lever still engages the fork for clutch 235, a direct drive is provided subsequent to the synchronization of driving and driven shafts.

Among the advantages of the improved transmission described above as compared with prior known types of transmissions, may be noted the following:

The shafts are more rigidly supported. From an inspection of Figure 1 it will be seen that the driving shaft is supported by the ball bearing at the fly wheel end and by a ball bearing in the front transmission wall. The main or splined shaft is supported in the rear wall of the transmission by ball bearings and in the open end of the driving shaft by roller bearings, the latter being substantially in the plane of the ball bearing support of the driving shaft. The end thrust of each shaft is taken by the bearings in the casing walls. In the case of Figure 5, there is a second roller bearing between the aligned shafts at the rear end of the driving shaft. By this arrangement an extremely rigid shaft support is provided.

A much more compact assembly is provided than is usual with helical gear transmissions. The use of wider gear faces is made possible with no increase in the size of the complete unit.

The use of smaller diameter gears reduces the moment of the idling gear system.

The reverse idler is provided with a long hub giving maximum rigidity and avoiding wear and does so without increasing the length of the transmission housing.

I claim:

1. In a transmission, aligned driving and driven shafts and a countershaft, constant mesh gears on the driving shaft and the countershaft, a second speed driven gear fixed on the driven shaft, a clutch slidable and non-rotatable on the driving shaft to engage the second speed gear on the driven shaft for driving in high or direct speed, a gear in constant mesh with the second speed driven gear and rotatably mounted on the countershaft, another gear fixed to the countershaft, a clutch on the hub of said rotatable countershaft gear and slidable to engage said fixed countershaft gear to lock said rotatably mounted gear to said countershaft.

2. The invention defined by claim 1, together with means to effect synchronization between said parts to be clutched and operable prior to the engagement of each of said clutches together with lever means to move said clutches simultaneously in the same axial direction.

3. The invention defined by claim 1, together with means to effect synchronization between said parts to be clutched and operable prior to the engagement of each of said clutches together with lever means to move said clutches simultaneously in the same axial direction, and a manually operated lever to rock said first mentioned lever.

4. The invention defined by claim 1, together with a low speed driven gear rotatable about but axially fixed relative to the driven shaft, a gear on the countershaft in constant mesh therewith and a clutch on the hub of the low speed driven gear movable to lock said gear to the driven shaft.

5. The invention defined by claim 1, together with a low speed driven gear rotatable about but axially fixed relative to the driven shaft, a gear on the countershaft in constant mesh therewith and a clutch on the hub of the low speed driven gear movable to lock said gear to the driven shaft, together with a gear terminally fixed to the driven shaft, a double gear reverse idler element, one gear thereof being in constant mesh with the driving gear of the low speed train, and the second gear axially slidable on the hub on the reverse idler element into engagement with the terminally driven shaft gear.

6. The invention defined by claim 1, together with a low speed driven gear rotatable about but axially fixed relative to the driven shaft, a gear on the countershaft in constant mesh therewith and a clutch on the hub of the low speed driven gear movable to lock said gear to the driven shaft, together with a gear terminally fixed to the driven shaft, a double gear reverse idler element, one gear thereof being in constant mesh with the driving gear of the low speed train, and the second gear axially slidable on the hub on the reverse idler element into engagement with the terminally driven shaft gear, together with a first and manually operable lever, a second and intermediate lever engaged with one arm of the first lever, a third lever having one arm operable to move the movable reverse idler gear, the other arm of the third lever being rocked by the second lever, said second lever being operable to move the low speed clutch in one direction and through the instrumentality of the third lever to move the slidable reverse idler gear in the opposite direction.

7. In a change speed transmission having aligned driving and driven shafts and a countershaft, a gear fixed to the driven shaft near the adjacent ends of said driving and driven shafts, a clutch slidably splined on the driving shaft and movable to engage and lock the said gear from rotation relative to the driving shaft, a gear train comprising meshing gears fixed on the driving shaft and countershaft, a gear loosely mounted on the countershaft and in mesh with the gear fixed to the driven shaft, a clutch slidably splined to the countershaft to engage and hold said last-named gear for rotation relative to the countershaft, and means to move said two clutches together in one direction to render one of said clutches operative and the other inoperative, and to move said clutches in the opposite direction to reverse the action of said clutches.

ROSCOE BERINGER.